United States Patent
Yoshikawa

(10) Patent No.: US 10,663,366 B2
(45) Date of Patent: May 26, 2020

(54) SEMICONDUCTOR PRESSURE SENSOR

(71) Applicant: Mitsubishi Electric Corporation, Tokyo (JP)

(72) Inventor: Eiji Yoshikawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 106 days.

(21) Appl. No.: 15/933,490

(22) Filed: Mar. 23, 2018

(65) Prior Publication Data

US 2019/0178739 A1    Jun. 13, 2019

(30) Foreign Application Priority Data

Dec. 13, 2017    (JP) .................................. 2017-238288

(51) Int. Cl.
   *G01L 9/00*      (2006.01)
   *H01M 8/04089*   (2016.01)
   *H01M 8/0438*    (2016.01)

(52) U.S. Cl.
   CPC .......... *G01L 9/0054* (2013.01); *G01L 9/0042* (2013.01); *H01M 8/04089* (2013.01); *H01M 8/04388* (2013.01); *H01M 8/04395* (2013.01)

(58) Field of Classification Search
   CPC . G01L 9/0054; G01L 9/0042; H01M 8/04089
   (Continued)

(56) References Cited

U.S. PATENT DOCUMENTS

| 4,771,638 A * | 9/1988 | Sugiyama ............. G01L 9/0042 338/4 |
| 4,975,390 A * | 12/1990 | Fujii .................... G01L 9/0042 148/DIG. 12 |

(Continued)

FOREIGN PATENT DOCUMENTS

JP            3994531 B2    10/2007

OTHER PUBLICATIONS

Sabrina Bedard et al., "Diffusion of hydrogen in crystalline silicon", Physical Review B, Apr. 15, 2000, pp. 9895-9898, vol. 61 No. 15.

*Primary Examiner* — Octavia Hollington
(74) *Attorney, Agent, or Firm* — Sughrue Mion, PLLC; Richard C. Turner

(57) ABSTRACT

A semiconductor pressure sensor includes: a first semiconductor substrate having a plurality of recesses formed thereon; an intermediate semiconductor substrate joined to the first semiconductor substrate with a first oxide film interposed therebetween; a second semiconductor substrate joined to the intermediate semiconductor substrate with a second oxide film interposed therebetween; a first reference pressure chamber formed as a space surrounded by a first recess of the first semiconductor substrate and the intermediate semiconductor substrate; a second reference pressure chamber formed as a space surrounded by a second recess formed on the first semiconductor substrate, the intermediate semiconductor substrate, and the second semiconductor substrate, the intermediate semiconductor substrate having a through hole communicating with the second recess of the first semiconductor substrate; and piezoresistors formed on a surface of the second semiconductor substrate that receives pressure, along outer peripheries of the first and second reference pressure chambers.

10 Claims, 10 Drawing Sheets

(58) Field of Classification Search
USPC .......................................................... 73/754
See application file for complete search history.

(56) References Cited

U.S. PATENT DOCUMENTS

| | | | | |
|---|---|---|---|---|
| 5,427,975 | A * | 6/1995 | Sparks | B81C 1/00246 216/2 |
| 10,352,802 | B2 * | 7/2019 | Tokuda | G01L 9/0054 |
| 2016/0153857 | A1 * | 6/2016 | Matsuzawa | G01L 9/0054 73/727 |
| 2016/0258828 | A1 * | 9/2016 | Takeuchi | G01L 9/0054 |
| 2016/0334292 | A1 * | 11/2016 | Oono | G01L 9/00 |

* cited by examiner

SEMICONDUCTOR PRESSURE SENSOR

BACKGROUND OF THE INVENTION

1. Field of the Invention

The present invention relates to a semiconductor pressure sensor to be used for measuring the pressure of hydrogen gas or gas containing hydrogen gas particularly in an automobile equipped with a fuel cell.

2. Description of the Background Art

In a type of fuel cell system mounted on a fuel cell vehicle or the like, a fuel cell stack capable of generating a high voltage is used. The fuel cell stack is configured such that an insulating plate, a current collecting plate, an end plate, or the like is interposed in a fuel cell stacked body. The fuel cell stacked body is obtained by stacking multiple fuel cell sets. One fuel cell set generally includes: a membrane electrode assembly (MEA) composed of an anode-side electrode, an electrolyte membrane, and a cathode-side electrode; and a separator.

In the fuel cell stack, cell reaction occurs by supplying fuel gas (for example, hydrogen gas) to the anode side and oxygen gas (for example, air) to the cathode side, so that electromotive force is generated, and water is produced at the cathode side. To efficiently perform the power generation, it is necessary to accurately measure the amounts of hydrogen gas and air supplied to the fuel cell stack, and supply hydrogen gas and air while the amounts of hydrogen gas and air are being controlled such that an excess or deficiency thereof is not caused. A pressure sensor is used for controlling hydrogen gas.

Hitherto, a pressure sensor in which a metallic material typified by SUS316 is used for a pressure-receiving housing or a pressure-receiving diaphragm has been used for measuring the pressure of hydrogen gas or gas containing hydrogen gas. The metallic material basically has a problem of hydrogen embrittlement, and thus the surface thereof is subjected to coating for preventing hydrogen embrittlement. Reliability is ensured, but there is a critical problem that the weight is large and the cost is high, so that the pressure sensor is not suitable for vehicle mounting. Furthermore, since the pressure-receiving diaphragm is formed from the metallic material, there is a problem that it is difficult to increase the measurement accuracy and responsiveness.

Meanwhile, a semiconductor pressure sensor in which single crystal silicon is used for a pressure-receiving diaphragm has been used. In the semiconductor pressure sensor, to measure an absolute pressure, the interior of a reference pressure chamber is made into a vacuum state. The reference pressure chamber is often formed by anodic bonding of: a silicon wafer having a pressure-receiving diaphragm; and a glass wafer that is to be a seating. However, regarding the molecular size of hydrogen gas, the covalent radius thereof is about 37 pm, and the van der Waals radius thereof is about 120 pm, that is, the molecular size is very small. Thus, since a porous material such as glass has a property in that gas molecules pass therethrough, there is a problem that such a porous material is not suitable for use for measuring the pressure of gas containing hydrogen.

To handle such problems, there is a semiconductor pressure sensor in which a reference pressure chamber is formed by using a single crystal silicon material without using a glass wafer (for example, see Patent Document 1). In the semiconductor pressure sensor, a first silicon substrate that is to be a seating and a second silicon substrate having a pressure-receiving diaphragm and a recess are joined together in a vacuum state with an oxide film interposed therebetween, and a reference pressure chamber is formed by the recess and the surface of the seating. Piezoresistors are provided at a peripheral portion of the diaphragm. The pressure is measured by the piezoresistors detecting stress generated by the diaphragm bending when pressure is applied. Since the reference pressure chamber is formed by using single crystal silicon as described above, the pressure of gas containing gas having a small molecular size such as hydrogen is also accurately measured. In addition, the operating temperature range of a semiconductor pressure sensor in use for measuring the pressure of air sucked by a fuel cell system mounted on a fuel cell vehicle or the like as intended in the present invention or by an engine mounted on an automobile, is up to about 120° C., and the hydrogen diffusion coefficient of single crystal silicon in such a temperature range is very low. Thus, even in consideration of the hydrogen diffusion coefficient, it is possible to maintain a high vacuum state of the reference pressure chamber (for example, see Non-Patent Document 1 for the temperature dependency of the hydrogen diffusion coefficient).

Patent Document 1: Japanese Patent No. 3994531
Non-Patent Document 1: Sabrina Bedard et al. "Diffusion of hydrogen in crystalline silicon", Phys. Rev. B 61, 9895 (2000)

However, also in the semiconductor pressure sensor in which the reference pressure chamber is formed by using a single crystal silicon material, there is still a critical problem about ensuring of functional safety and high-accuracy measurement in the use intended in the present invention.

Based on the present manufacturing technique for a semiconductor pressure sensor, the failure rate of a vehicle over its life period is about 20 to 100 FIT (Failure In Time), and thus the functional safety required by a system assumed for the semiconductor pressure sensor according to the present invention cannot be sufficiently satisfied. A conventional semiconductor pressure sensor includes only one diaphragm. Thus, if an abnormality such as breakage occurs in the diaphragm due to some kind of unexpected reasons, the entire system causes malfunction. In the worst case, there is a risk of leading to a critical event such as incapability of running, and functional safety is not ensured. The conventional semiconductor pressure sensor disclosed in Patent Document 1 includes only one diaphragm, and thus is included in this case.

To improve the functional safety, redundancy of the function of the semiconductor pressure sensor can be achieved by including a plurality of diaphragms having the same thickness and size. For performing fail determination as to an operating state, high-accuracy pressure measurement in different pressure ranges is further required. However, this requirement is not met even when a plurality of diaphragms having the same thickness and size and exhibiting the same pressure-sensitive characteristics are provided. For performing pressure measurement with high accuracy for the different pressure ranges, the semiconductor pressure sensor needs to include diaphragms having pressure-sensitive characteristics optimized in accordance with the respective pressure ranges. In the case of achieving this within a single chip for the conventional semiconductor pressure sensor, for producing diaphragms having different pressure-sensitive characteristics, the sizes of the diaphragms are changed in the plane direction. When the size of the diaphragm is optimally designed in accordance with the wider pressure range (high-pressure side), the size of the diaphragm for the narrower pressure range (low-pressure side) has to be increased, so that the size of the chip for the semiconductor pressure sensor is increased. In addition, when the low-pressure-side diaphragm is optimally designed, it is difficult to achieve high accuracy at the high-pressure-side. As described above, the single semiconductor pressure sensor having an appropriate size does not meet the requirement of high-accuracy measurement for the different pressure ranges.

SUMMARY OF THE INVENTION

A semiconductor pressure sensor according to the present invention includes: a first semiconductor substrate having a plurality of recesses formed thereon; an intermediate semiconductor substrate joined to the first semiconductor substrate with a first oxide film interposed therebetween; a second semiconductor substrate joined to the intermediate semiconductor substrate with a second oxide film interposed therebetween; a first reference pressure chamber formed as a space surrounded by a first recess of the first semiconductor substrate and the intermediate semiconductor substrate; a second reference pressure chamber formed as a space surrounded by a second recess formed on the first semiconductor substrate, the intermediate semiconductor substrate, and the second semiconductor substrate, the intermediate semiconductor substrate having a through hole communicating with the second recess of the first semiconductor substrate; and piezoresistors formed on a surface of the second semiconductor substrate that receives pressure, along outer peripheries of the first and second reference pressure chambers.

With the semiconductor pressure sensor according to the present invention, pressure can be measured with high accuracy for a plurality of different pressure ranges without increasing the size of the semiconductor pressure sensor.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

Embodiment 1

Figure 1:
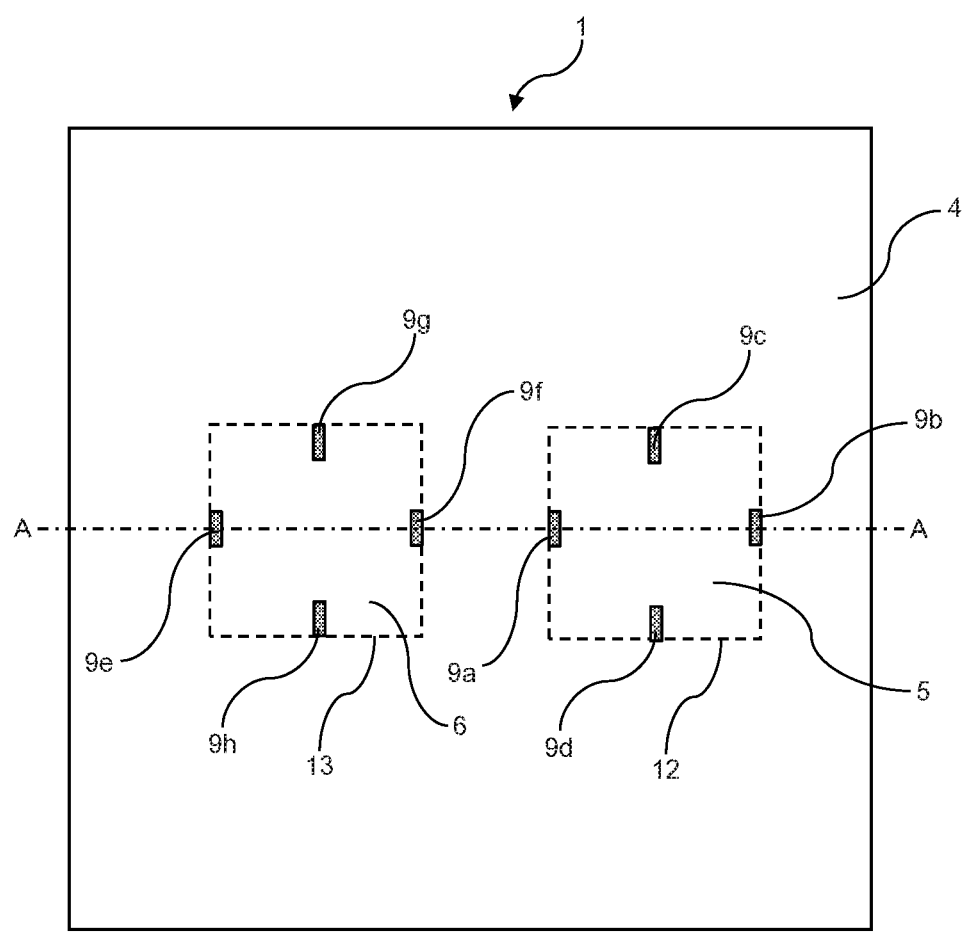
FIG. 1 is a plan view of a semiconductor pressure sensor according to Embodiment 1 of the present invention.
Figure 2:
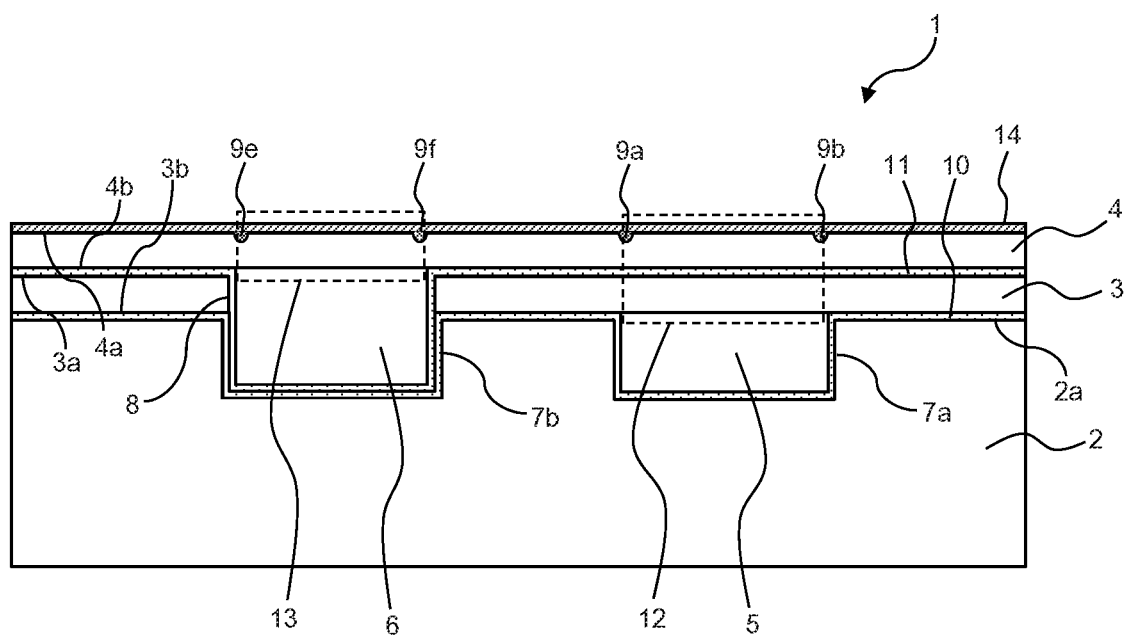
FIG. 2 is a cross-sectional view of the semiconductor pressure sensor according to Embodiment 1 of the present invention.

FIG. 1 is a plan view of a semiconductor pressure sensor 1 according to Embodiment 1 of the present invention, and FIG. 2 is a cross-sectional view taken along an alternate long and short dash line A-A in FIG. 1. Hereinafter, the semiconductor pressure sensor 1 will be described with reference to the drawings.

The semiconductor pressure sensor 1 includes: a first semiconductor substrate 2 that has a first recess 7a and a second recess 7b formed on a main surface 2a thereof; an intermediate semiconductor substrate 3 that has a through hole 8 communicating with the second recess 7b and that covers the first recess 7a; a second semiconductor substrate 4 that covers the through hole 8 and the second recess 7b; and piezoresistors 9a to 9h that are provided on a main surface 4a of the second semiconductor substrate 4, which is a surface that receives pressure, so as to be spaced apart from each other. The main surface 2a of the first semiconductor substrate 2 and a main surface 3b of the intermediate semiconductor substrate 3 are joined together with a first oxide film 10 interposed therebetween, and a main surface 3a of the intermediate semiconductor substrate 3 and a main surface 4b of the second semiconductor substrate 4 are joined together with a second oxide film 11 interposed therebetween. A protective film 14 is provided on the main surface 4a of the second semiconductor substrate 4 (the protective film 14 is not shown in FIG. 1). Single crystal silicon substrates are used as the first semiconductor substrate 2, the intermediate semiconductor substrate 3, and the second semiconductor substrate 4, and the intermediate semiconductor substrate 3 and the second semiconductor substrate 4 are deformable thin substrates.

A first reference pressure chamber 5 is formed as a space surrounded by: the first recess 7a, which is formed in the thickness direction from the main surface 2a of the first semiconductor substrate 2; and the intermediate semiconductor substrate 3, which covers the first recess 7a. In FIG. 2, a region of the second semiconductor substrate 4 and the intermediate semiconductor substrate 3, which opposes the first recess 7a, the region being surrounded by a broken line at the right side, forms a cross-section of a first diaphragm 12. The diaphragm is a deformable pressure-receiving portion having a rectangular shape, and bending occurs therein in response to the received pressure. The degree of bending, that is, pressure-sensitive characteristics, is determined by the size and the thickness of the diaphragm. Regarding the first diaphragm 12, a thickness obtained by summing the thickness of the intermediate semiconductor substrate 3 and the thickness of the second semiconductor substrate 4 is mainly the thickness of the diaphragm. In FIG. 1, a portion surrounded by a broken line at the right side is a region where the first diaphragm 12 is formed, and has a square shape. The position of the broken line is the position of the outer periphery of the first reference pressure chamber 5.

A second reference pressure chamber 6 is formed as a space surrounded by: the second recess 7b, which is formed in the thickness direction from the main surface 2a of the first semiconductor substrate 2; the intermediate semiconductor substrate 3, which forms the through hole 8; and the second semiconductor substrate 4, which covers the through hole 8. The through hole 8 is formed in the thickness direction of the intermediate semiconductor substrate 3 so as to correspond to the outer shape of the second recess 7b. In FIG. 2, a region of the second semiconductor substrate 4, which opposes the second recess 7b and the through hole 8, the region being surrounded by a broken line at the left side, forms a cross-section of a second diaphragm 13. Regarding the second diaphragm 13, the thickness of the second semiconductor substrate 4 is mainly the thickness of the diaphragm. In FIG. 1, a portion surrounded by a broken line at the left side is a region where the second diaphragm 13 is formed. The position of the broken line is the position of the outer periphery of the second reference pressure chamber 6.

When pressure is applied to the main surface 4a of the second semiconductor substrate 4, the first diaphragm 12 and the second diaphragm 13 bend in response to the pressure difference between the first reference pressure chamber 5 and the second reference pressure chamber 6 and the outside. Accordingly, bending occurs in the regions of the piezoresistors 9a to 9h, and the resistance values thereof change in response to the bending. The resistance values are taken out as electric signals through a diffusion wiring layer or a metallic electrode film (not shown) to the outside.

The protective film 14 is formed for the purpose of protecting the piezoresistors 9a to 9h, the diffusion wiring layer, etc. from an outside harmful environment. The material of the protective film 14 is, for example, a silicon nitride film (SiNx). In the case where there is no concern about a harmful environment, the protective film 14 may not be provided.

Figure 3:
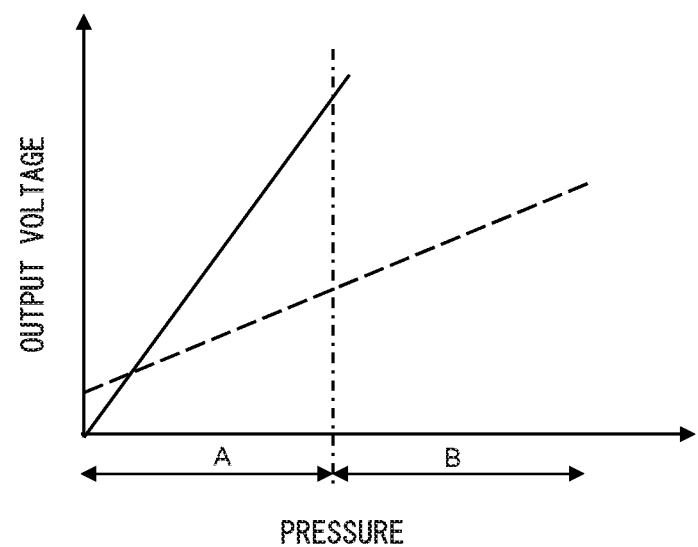
FIG. 3 is a graph indicating output characteristics of the semiconductor pressure sensor according to Embodiment 1 of the present invention.

FIG. 3 is a graph indicating output characteristics of the semiconductor pressure sensor 1 according to Embodiment 1 of the present invention. In FIG. 3, a broken line indicates output characteristics of the first diaphragm 12, and a solid line indicates output characteristics of the second diaphragm 13. The horizontal axis indicates applied pressure, and the vertical axis indicates an output voltage corresponding to the pressure-sensitive characteristics of the diaphragm. The first diaphragm 12 and the second diaphragm 13 have the same shape in FIG. 1, but, since the thicknesses thereof are different from each other, amounts of bending thereof with respect to the same pressure are different from each other. Thus, the pressure-sensitive characteristics of the first diaphragm 12 and the second diaphragm 13 are different from each other. The first diaphragm 12 which is thicker bends to a small extent, and the second diaphragm 13 which is thinner bends to a large extent. Therefore, by using the second diaphragm 13 when the applied pressure falls within a region A shown in FIG. 3, and using the first diaphragm 12 when the applied pressure falls within a region B shown in FIG. 3, pressure measurement is enabled in different pressure regions without increasing the size of the semiconductor pressure sensor 1. Accordingly, for performing fail determination as to an operating state, pressure measurement can be performed with high accuracy for different pressure ranges. Since the thickness of the second diaphragm 13 is smaller than that of the first diaphragm 12, the second diaphragm 13 has a higher possibility of breakage. Even when an abnormality such as breakage occurs in the second diaphragm 13, pressure measurement in the two regions A and B is possible with the first diaphragm 12. In such a case, the accuracy of measurement in the region A decreases to some extent, but malfunction of the entire system can be avoided.

Next, a method for manufacturing the semiconductor pressure sensor 1 will be described. A plurality of semiconductor pressure sensors 1 are simultaneously manufactured on a wafer that is a single crystal silicon substrate. However, here, manufacture of one semiconductor pressure sensor 1 will be described. The semiconductor pressure sensor 1 has a square shape having one side of about 1 mm in a plan view. The first diaphragm 12 and the second diaphragm 13 have a square shape having one side of about 300 μm. First, the first recess 7a and the second recess 7b are formed on the main surface 2a of the first semiconductor substrate 2 by etching. For forming the shapes of the first reference pressure chamber 5 and the second reference pressure chamber 6, that is, the shapes of the first diaphragm 12 and the second diaphragm 13 with high accuracy, inductive coupled plasma-reactive ion etching (ICP-RIE) using the Bosch process is preferably used. The etching method is not limited thereto, and wet anisotropic etching using an etching solution such as potassium hydroxide (KOH) or tetramethyl ammonium hydroxide (TMAH) may be used for forming the first recess 7a and the second recess 7b. The depths of the first recess 7a and the second recess 7b are related to the volumes of the first reference pressure chamber 5 and the second reference pressure chamber 6. From the viewpoint that a change in the internal pressure is reduced to be small even if any gas such as hydrogen enters the first reference pressure chamber 5 or the second reference pressure chamber 6 by any chance, the volumes are preferably larger, so that it is necessary to perform etching as deep as possible. However, the processing load increases. Here, entry of gas such as hydrogen into the first reference pressure chamber 5 and the second reference pressure chamber 6 is prevented by not using a glass wafer as a seating and forming the first reference pressure chamber 5 and the second reference pressure chamber 6 with use of a single crystal silicon substrate. Thus, from the viewpoint of reducing the processing load, the depths of the first recess 7a and the second recess 7b may be about 10 μm to 100 μm.

Subsequently, the first oxide film 10 is formed on the main surface 2a of the first semiconductor substrate 2 by thermal oxidation. The first oxide film 10 is also formed on the surfaces of the first recess 7a and the second recess 7b. The first oxide film 10 is needed for promoting joining with the intermediate semiconductor substrate 3, and the thickness thereof is suitably about 0.1 μm to 0.5 μm. Here, the example in which the first oxide film 10 is formed on the main surface 2a of the first semiconductor substrate 2 has been described, but the first oxide film 10 may be formed on the main surface 3b of the intermediate semiconductor substrate 3.

Subsequently, the main surface 2a of the first semiconductor substrate 2 and the main surface 3b of the intermediate semiconductor substrate 3 are joined together in a vacuum, whereby the first reference pressure chamber 5 is formed. The joining is preferably performed in an acid atmosphere at a high temperature of about 1100° C., but, depending on the proportion of the areas of the first recess 7a and the second recess 7b in the area of the entire wafer, the joining strength may be further enhanced by increasing the temperature to about 1200° C.

Since the intermediate semiconductor substrate 3 that covers the first recess 7a becomes a portion of the first diaphragm 12, the substrate thickness is adjusted in accordance with the range of pressure to be measured, after the first semiconductor substrate 2 and the intermediate semiconductor substrate 3 are joined together. Specifically, the substrate thickness is adjusted to a predetermined thickness, for example, about 20 μm, by grinding or polishing the entirety of the main surface 3a of the intermediate semiconductor substrate 3. This is because, in joining, it is difficult to handle the intermediate semiconductor substrate 3 having a small thickness of about 20 μm.

Subsequently, the through hole 8, which penetrates the intermediate semiconductor substrate 3 and communicates with the second recess 7b, is formed. As the means for forming the through hole 8, ICP-RIE using the Bosch process is preferable similar to the method for forming the first recess 7a and the second recess 7b. The outer shape of the through hole 8 is a square shape similar to the outer shape of the second recess 7b.

Subsequently, the second oxide film 11 is formed on the main surface 3a of the intermediate semiconductor substrate 3 by thermal oxidation. The second oxide film 11 is also formed on the wall surface of the through hole 8 and the surface of the second recess 7b. The second oxide film 11 is needed for promoting joining with the second semiconductor substrate 4, and the thickness thereof is suitably about 0.1 μm to 0.5 μm. Here, the example in which the second oxide film 11 is formed on the main surface 3a of the intermediate semiconductor substrate 3 has been described, but the second oxide film 11 may be formed on the main surface 4b of the second semiconductor substrate 4.

Subsequently, the main surface 3a of the intermediate semiconductor substrate 3 and the main surface 4b of the second semiconductor substrate 4 are joined together in a vacuum, whereby the second reference pressure chamber 6 is formed. The joining is preferably performed in an acid atmosphere at a high temperature of about 1100° C.

Since the second semiconductor substrate 4 that covers the first recess 7a becomes a portion of the first diaphragm 12, and the second semiconductor substrate 4 that covers the second recess 7b becomes the second diaphragm 13, the substrate thickness is adjusted in accordance with the range of pressure to be measured, after the intermediate semiconductor substrate 3 and the second semiconductor substrate 4 are joined together. Specifically, the substrate thickness is adjusted to a predetermined thickness, for example, about 20 μm, by grinding or polishing the entirety of the main surface 4a of the second semiconductor substrate 4. This is because, in joining, it is difficult to handle the second semiconductor substrate 4 having a small thickness of about 20 μm. Through the above steps, the first diaphragm 12 and the second diaphragm 13 having predetermined different thicknesses are formed.

Subsequently, ion implantation of impurities such as boron is performed along the outer edge portions of the first diaphragm 12 and the second diaphragm 13, that is, along the outer peripheries of the first reference pressure chamber 5 and the second reference pressure chamber 6, and then thermal treatment or the like is performed, whereby the piezoresistors 9a to 9h are formed. Furthermore, a diffusion wiring layer is formed by ion implantation and subsequent thermal treatment, and a metallic electrode film is formed by forming a film of Al, Al—Si, Al—Si—Cu, or the like by a method such as sputtering.

Thereafter, the protective film 14 is formed on the main surface 4a of the second semiconductor substrate 4 by forming a film of silicon nitride or the like by a film formation method such as CVD (Chemical Vapor Deposition), whereby the semiconductor pressure sensor 1 is obtained. A plurality of semiconductor pressure sensors 1 are manufactured on a wafer, and thus are separated from each other by dicing.

Figure 4:
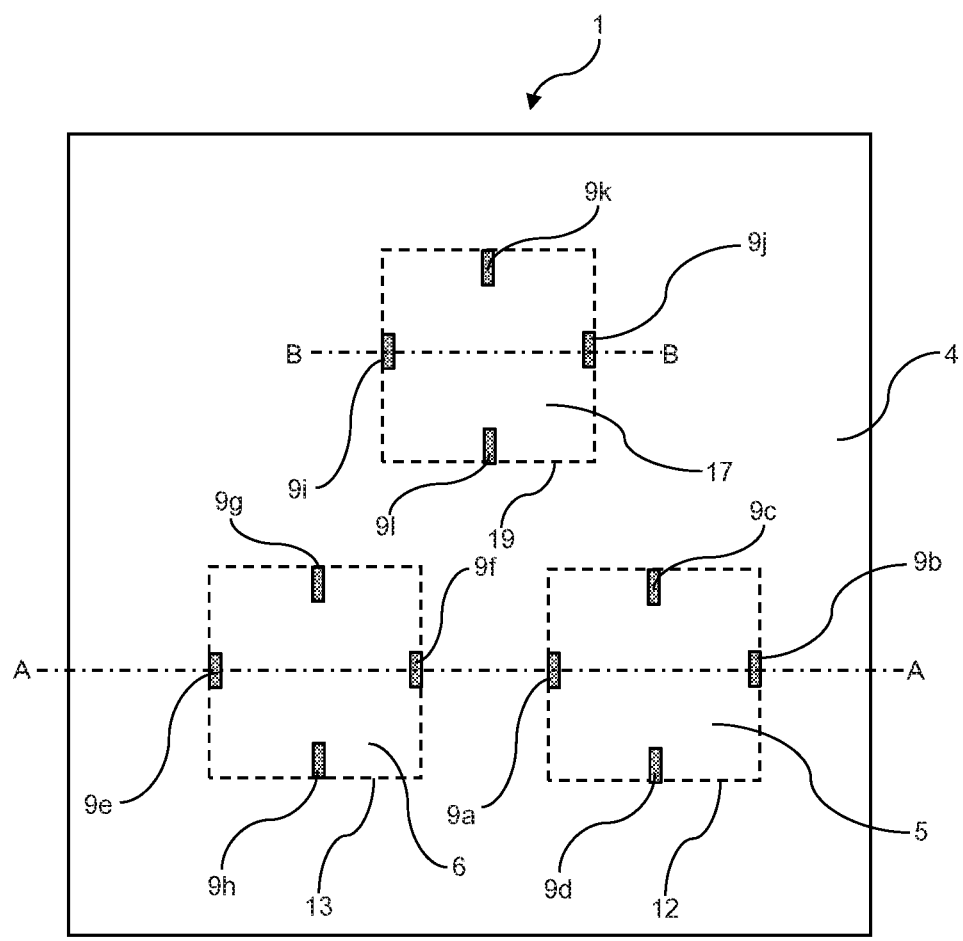
FIG. 4 is a plan view of another semiconductor pressure sensor according to Embodiment 1 of the present invention.
Figure 5:
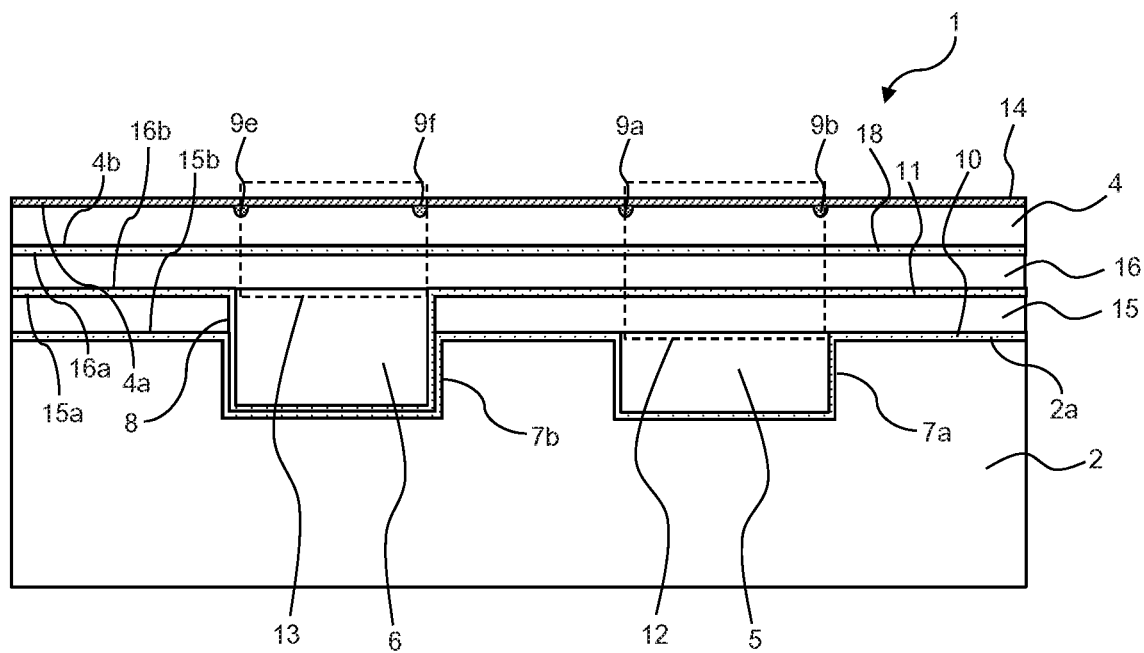
FIG. 5 is a cross-sectional view of the other semiconductor pressure sensor according to Embodiment 1 of the present invention.
Figure 6:
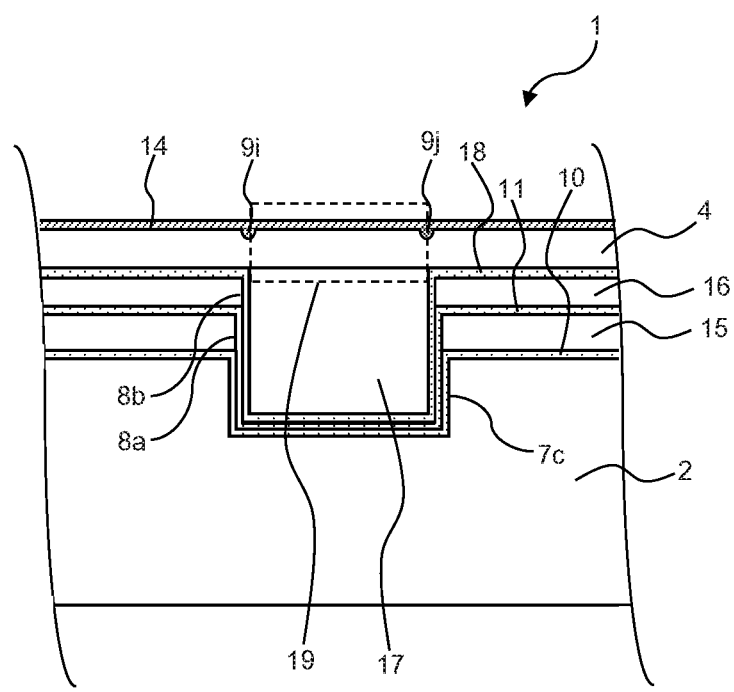
FIG. 6 is a cross-sectional view of the other semiconductor pressure sensor according to Embodiment 1 of the present invention.

Next, another semiconductor pressure sensor 1 according to Embodiment 1 will be described with reference to FIGS. 4 to 6. FIG. 4 is a plan view of the other semiconductor pressure sensor 1, and FIGS. 5 and 6 are cross-sectional views of the other semiconductor pressure sensor 1. FIG. 5 is a cross-sectional view taken along an alternate long and short dash line A-A in FIG. 4, and FIG. 6 is a cross-sectional view taken along an alternate long and short dash line B-B in FIG. 4. In FIG. 4, the protective film 14 is not shown. The semiconductor pressure sensor 1 is provided with a first intermediate semiconductor substrate 15 and a second intermediate semiconductor substrate 16 and additionally includes a third reference pressure chamber 17 and a third diaphragm 19. The other components are the same as described above, and thus are designated by the same reference characters.

The third reference pressure chamber 17 is formed as a space surrounded by: a third recess 7c that is formed in the thickness direction from the main surface 2a of the first semiconductor substrate 2; the first intermediate semiconductor substrate 15 and the second intermediate semiconductor substrate 16 that form the through holes 8a and 8b; and the second semiconductor substrate 4 that covers the through hole 8b. The through hole 8a is formed in the thickness direction of the first intermediate semiconductor substrate 15 so as to correspond to the outer shape of the third recess 7c. The through hole 8b is formed in the thickness direction of the second intermediate semiconductor substrate 16 so as to correspond to the outer shape of the third recess 7c. In FIG. 6, a region of the second semiconductor substrate 4, which opposes the third recess 7c and the through holes 8a and 8b, the region being surrounded by a broken line, forms a cross-section of the third diaphragm 19. Regarding the third diaphragm 19, the thickness of the second semiconductor substrate 4 is mainly the thickness of the diaphragm. In FIG. 4, a portion surrounded by a broken line at the upper side is a region where the third diaphragm 19 is formed. The position of the broken line is the position of the outer periphery of the third reference pressure chamber 17. The first intermediate semiconductor substrate 15 and the second intermediate semiconductor substrate 16 are joined together with the second oxide film 11 interposed therebetween, and the second intermediate semiconductor substrate 16 and the second semiconductor substrate 4 are joined together with a third oxide film 18 interposed therebetween.

Figure 7:
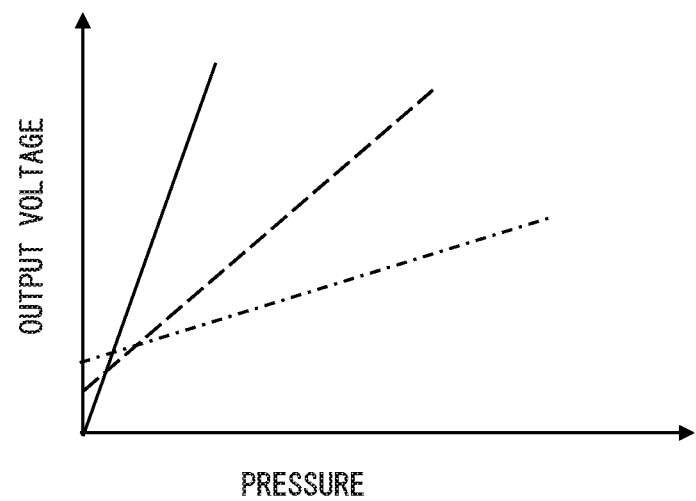
FIG. 7 is a graph indicating output characteristics of the other semiconductor pressure sensor according to Embodiment 1 of the present invention.

FIG. 7 is a graph indicating output characteristics of the semiconductor pressure sensor 1 shown in FIGS. 4 to 6. In FIG. 7, an alternate long and short dash line indicates output characteristics of the first diaphragm 12, a broken line indicates output characteristics of the second diaphragm 13, and a solid line indicates output characteristics of the third diaphragm 19. The horizontal axis indicates applied pressure, and the vertical axis indicates an output voltage corresponding to the pressure-sensitive characteristics of the diaphragm. Since three diaphragms, the first diaphragm 12, the second diaphragm 13, and the third diaphragm 19, are included, pressure measurement is enabled in further different pressure regions without increasing the size of the semiconductor pressure sensor 1. Accordingly, for performing fail determination as to an operating state, pressure measurement can be performed with high accuracy for further different pressure ranges. Further, malfunction of the entire system can also be avoided.

The use of the semiconductor pressure sensor 1 according to the present invention is not limited to a vehicle equipped with a fuel cell system. Also, for a conventional automobile equipped with an engine, an attempt for improving combustion efficiency has been made by a method such as mixing a small amount of hydrogen gas into intake air by using a technique such as fuel reforming. Thus, the semiconductor pressure sensor 1 according to the present invention is suitable for use for measuring the pressure of such air containing hydrogen gas.

As described above, in the semiconductor pressure sensor 1 according to Embodiment 1 of the present invention, since the two or three diaphragms have different pressure-sensitive characteristics by changing the thickness with the same shape in a plan view, high-accuracy measurement for different pressure regions can be achieved at low cost without increasing the size of the semiconductor pressure sensor. In addition, since the two or three diaphragms are provided, even when an abnormality such as breakage occurs in one diaphragm, measurement can be continued with another diaphragm, so that malfunction of the entire system can be avoided. Here, the example of the semiconductor pressure sensor including the two or three diaphragms has been described. However, when an intermediate semiconductor substrate having a through hole communicating with the recess of the first semiconductor substrate is further stacked, a semiconductor pressure sensor having four or more diaphragms having different thicknesses can be further produced.

Embodiment 2

Figure 8:
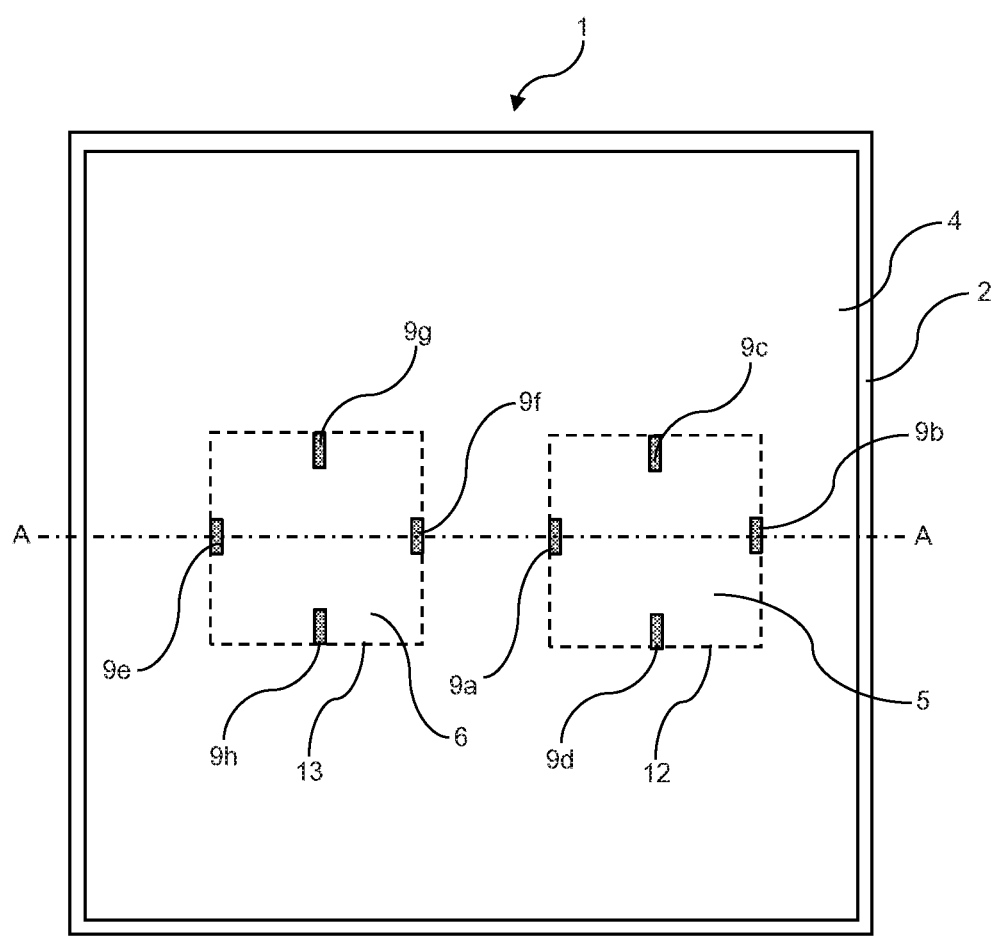
FIG. 8 is a plan view of a semiconductor pressure sensor according to Embodiment 2 of the present invention.
Figure 9:
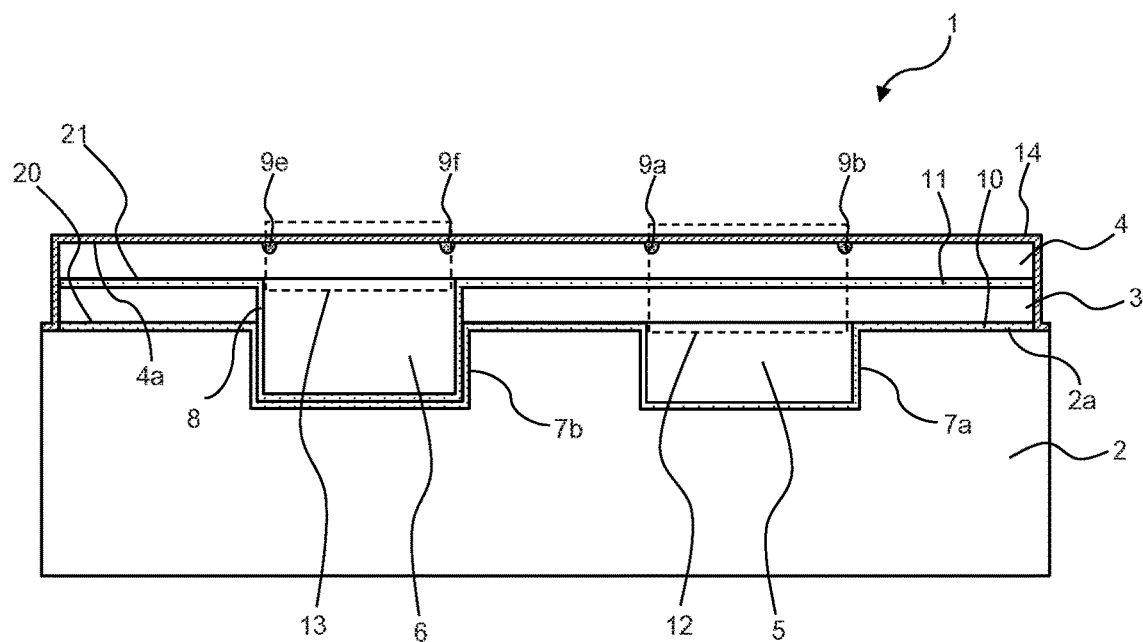
FIG. 9 is a cross-sectional view of the semiconductor pressure sensor according to Embodiment 2 of the present invention.

FIG. 8 shows a plan view of a semiconductor pressure sensor 1 according to Embodiment 2 of the present invention, and FIG. 9 shows a cross-sectional view of the semiconductor pressure sensor 1. FIG. 9 is a cross-sectional view taken along an alternate long and short dash line A-A in FIG. 8. In FIG. 8, the protective film 14 is not shown. In Embodiment 1, a first joint interface 20 at which the first semiconductor substrate 2 and the intermediate semiconductor substrate 3 are joined together and a second joint interface 21 at which the intermediate semiconductor substrate 3 and the second semiconductor substrate 4 are joined together are exposed on the side surfaces of the semiconductor pressure sensor 1. However, in Embodiment 2, the laminated protective film 14 is formed on the side surfaces of the intermediate semiconductor substrate 3, the second semiconductor substrate 4, the first oxide film 10, and the second oxide film 11 so as to cover these side surfaces such that these interfaces are not exposed. The other components are the same as described in Embodiment 1 and thus are designated by the same reference characters, and the description thereof is omitted.

Figure 10:
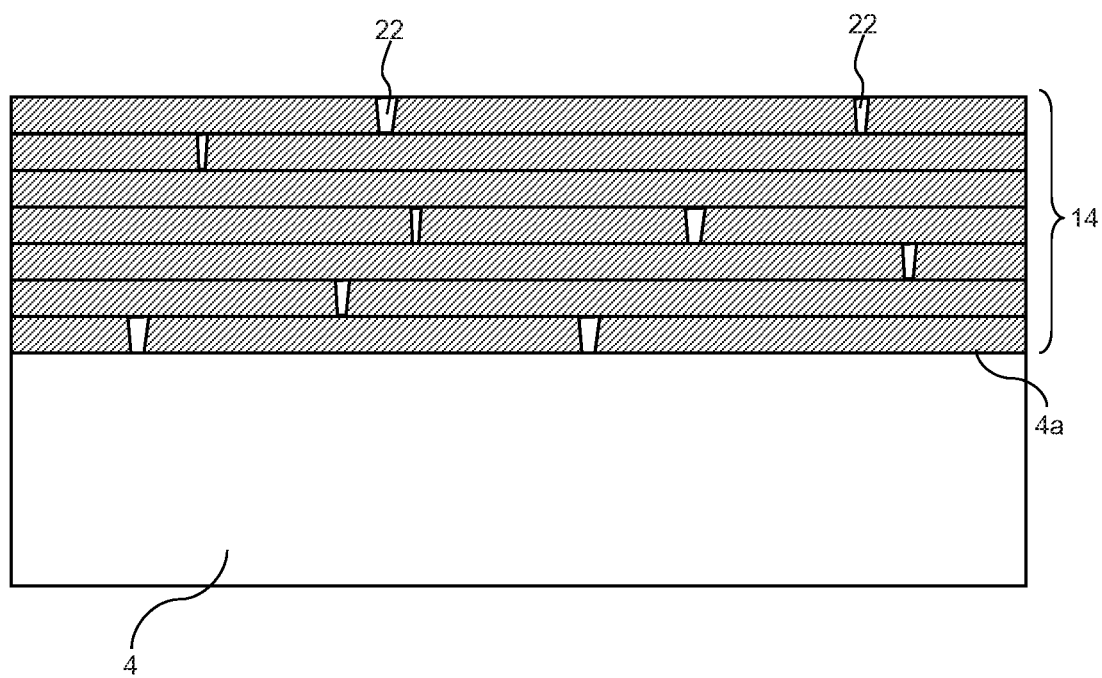
FIG. 10 is an enlarged view of the vicinity of a protective film in FIG. 9.

As the protective film 14, for example, a silicon nitride film (SiNx) formed by a film formation method such as CVD is suitable. To reduce influence of residual stress of the silicon nitride film on the pressure-sensitive characteristics, the thickness of the protective film 14 is preferably thinner as long as the protection effect is not impaired. However, when the protective film 14 is too thin, pinholes 22, which are difficult to eliminate, are likely to penetrate the protective film 14. When the pinholes 22 penetrate the protective film 14, the protection effect is significantly impaired. Therefore, as shown in FIG. 10, the protective film 14 is formed as a multilayer film obtained by laminating silicon nitride films. The lamination step is continuously carried out such that the thickness of a film to be formed per time is set to about 0.1 µm and a wafer is not taken out from a chamber for CVD each time a film is formed. The protective film 14 having no pinholes 22 penetrating the protective film 14 and having high reliability can be obtained by laminating films such that the pinholes 22 are not connected to each other. The pinholes 22 occur during film formation with a certain probability, but the pinholes 22 do not penetrate the entire protective film 14 unless the pinholes 22 occur and overlap with each other at the same position to be connected to each other each time lamination is performed. That is, the probability with which the pinholes 22 penetrating the protective film 14 are formed is proportional to the product of probabilities with which the pinholes 22 occur in the respective laminated films, and thus the probability of occurrence of the pinholes 22 penetrating the protective film 14 can be significantly reduced by increasing the number of laminated films. In reality, the number of laminated films in the protective film 14 may be selected as appropriate from between about 5 to 10 in consideration of the entire thickness and the residual stress of the protective film 14.

An index x representing the composition ratio between silicon atoms and nitrogen atoms in the silicon nitride film (SiNx) which does not contain hydrogen and oxygen can theoretically take a value in the range of 0 to 4/3. The case where x takes the maximum value 4/3 in the range corresponds to a case of having a stoichiometric composition ratio, and the composition ratio is represented by $Si_3N_4$. In the case with this composition ratio, all bonds are Si—N bonds, and $Si_3N_4$ has an atomic arrangement in which silicon atoms and nitrogen atoms are close-packed. Silicon atoms and nitrogen atoms have different atomic sizes. Thus, in the case with $Si_3N_4$ in which silicon atoms and nitrogen atoms are close-packed, voids through which hydrogen atoms and the like as well as molecules pass are not present, so that the effect of preventing gas permeation becomes highest.

On the other hand, bonds (Si—Si) between silicon atoms increase as the value of x decreases from 4/3. When silicon atoms having the same size are bonded to each other, the atomic arrangement structure does not become a close-packed structure, and voids having a size larger than the hydrogen atomic size occur. According to percolation theory, as the value of x decreases, the sizes of the voids increase, and the voids communicate with each other to form a leak path through which hydrogen atoms pass. That is, the permeation prevention performance decreases, so that hydrogen gas starts passing through the film, depending on the film thickness. In particular, when the value of x becomes equal to or less than ½, a network of the leak path is three-dimensionally formed, so that the permeation prevention performance is fully eliminated. In view of the characteristics of the silicon nitride film as described above, in order to obtain effective permeation prevention performance, the value of x is preferably not less than 1. Therefore, effective permeation prevention performance can be obtained when $1 \leq x \leq 4/3$ is satisfied.

Next, a method for manufacturing the semiconductor pressure sensor 1 will be described. The method until formation of a metallic electrode film is the same as the manufacturing method in Embodiment 1, and thus the description thereof is omitted. Etching for penetrating the second semiconductor substrate 4 and the intermediate semiconductor substrate 3 and reaching the main surface 2a of the first semiconductor substrate 2 is performed in a boundary region of each semiconductor pressure sensor in a plan view within a single wafer, by means of ICP-RIE or the like. As a result of the etching, the side surfaces of the intermediate semiconductor substrate 3, the second semiconductor substrate 4, the first oxide film 10, and the second oxide film 11 are exposed. Thereafter, the protective film 14 is formed, so as to cover the main surface 4a of the second semiconductor substrate 4 and the side surfaces of the intermediate semiconductor substrate 3, the second semiconductor substrate 4, the first oxide film 10, and the second oxide film 11, as a multilayer film by forming a silicon nitride film a plurality of times by a film formation method such as CVD. The multilayer film is formed by continuously performing film formation without taking out the wafer from a chamber for CVD each time a film is formed. Due to the formation of the laminated protective film 14, even when leak paths that extend through the first joint interface 20 and the second joint interface 21 occur, the leak paths can be blocked, and no pinholes 22 penetrate the entirety of the protective film 14. The silicon nitride film which does not contain hydrogen or oxygen can be formed by a versatile film formation method such as CVD in a semiconductor process. Thus, such a film formation method has high compatibility with a step such as ion implantation to be used for forming piezoresistors, and cost reduction can be achieved. As a result of the formation of the protective film 14, the semiconductor pressure sensor 1 shown in FIG. 9 is obtained. A plurality of semiconductor pressure sensors 1 are manufactured on a wafer, and thus are subsequently separated from each other by dicing.

As described above, in the semiconductor pressure sensor 1 according to Embodiment 2 of the present invention, since the side surfaces of the intermediate semiconductor substrate, the second semiconductor substrate, the first oxide film, and the second oxide film are covered with the protective film, occurrence of leak paths extending through the joint interfaces can be avoided. In addition, since the protective film is provided, the first oxide film and the second oxide film provided at the joint interfaces are not exposed, and composition change can be prevented in advance, so that high reliability can be maintained. Moreover, since the protective film is a multilayer film obtained by laminating silicon nitride films (SiNx) that satisfy $1 \leq x \leq 4$ and that do not contain hydrogen and oxygen, effective permeation prevention performance can be obtained.

The configurations described above in Embodiments 1 and 2 are examples of the configuration of the present invention, and it is needless to say that modifications, including combinations or partial deletions of embodiments, can be made without departing from the scope and spirit of the present invention.

Various modifications and alterations of this invention will be apparent to those skilled in the art without departing from the scope and spirit of this invention, and it should be understood that this is not limited to the illustrative embodiments set forth herein.

DESCRIPTION OF THE REFERENCE CHARACTERS 1 semiconductor pressure sensor
2 first semiconductor substrate
3 intermediate semiconductor substrate
4 second semiconductor substrate
5 first reference pressure chamber
6 second reference pressure chamber
7a first recess
7b second recess
7c third recess
8 through hole
9 piezoresistor
10 first oxide film
11 second oxide film
12 first diaphragm
13 second diaphragm
14 protective film
15 first intermediate semiconductor substrate
16 second intermediate semiconductor substrate
17 third reference pressure chamber
18 third oxide film
19 third diaphragm
20 first joint interface
21 second joint interface
22 pinhole

What is claimed is:

1. A semiconductor pressure sensor comprising:
a first semiconductor substrate having a plurality of recesses formed thereon;
an intermediate semiconductor substrate joined to the first semiconductor substrate with a first oxide film interposed therebetween;
a second semiconductor substrate joined to the intermediate semiconductor substrate with a second oxide film interposed therebetween;
a first reference pressure chamber formed as a first space surrounded by a first recess of the first semiconductor substrate and the intermediate semiconductor substrate;
a second reference pressure chamber formed as a second space surrounded by a second recess formed on the first semiconductor substrate, the intermediate semiconductor substrate, and the second semiconductor substrate, the intermediate semiconductor substrate having a through hole communicating with the second recess of the first semiconductor substrate, the second semiconductor substrate being exposed to the second space without being exposed to the first space; and
piezoresistors formed on a surface of the second semiconductor substrate that receives pressure, along outer peripheries of the first reference pressure chamber and the second reference pressure chamber.

2. The semiconductor pressure sensor according to claim 1, further comprising a protective film formed on the surface of the second semiconductor substrate that receives pressure.

3. The semiconductor pressure sensor according to claim 1, further comprising a protective film formed on the surface of the second semiconductor substrate that receives pressure, on a side surface of the second semiconductor substrate, on a side surface of the intermediate semiconductor substrate, on a side surface of the first oxide film, and on a side surface of the second oxide film.

4. A semiconductor pressure sensor comprising:
a first semiconductor substrate having a plurality of recesses formed thereon;
a first intermediate semiconductor substrate joined to the first semiconductor substrate with a first oxide film interposed therebetween;
a second intermediate semiconductor substrate joined to the first intermediate semiconductor substrate with a second oxide film interposed therebetween;
a second semiconductor substrate joined to the second intermediate semiconductor substrate with a third oxide film interposed therebetween;
a first reference pressure chamber formed as a space surrounded by a first recess of the first semiconductor substrate and the first intermediate semiconductor substrate;
a second reference pressure chamber formed as a space surrounded by a second recess formed on the first semiconductor substrate, the first intermediate semiconductor substrate, and the second intermediate semiconductor substrate, the first intermediate semiconductor substrate having a through hole communicating with the second recess of the first semiconductor substrate;

a third reference pressure chamber formed as a space surrounded by a third recess formed on the first semiconductor substrate, the first intermediate semiconductor substrate, the second intermediate semiconductor substrate, and the second semiconductor substrate, the first intermediate semiconductor substrate having a through hole communicating with the third recess of the first semiconductor substrate, the second intermediate semiconductor substrate having a through hole communicating with the third recess of the first semiconductor substrate; and piezoresistors formed on a surface of the second semiconductor substrate that receives pressure, along outer peripheries of the first reference pressure chamber, the second reference pressure chamber, and the third reference pressure chamber.

5. The semiconductor pressure sensor according to claim 4, further comprising a protective film formed on the surface of the second semiconductor substrate that receives pressure.

6. The semiconductor pressure sensor according to claim 5, wherein the protective film is a multilayer film obtained by laminating silicon nitride films SiNx that satisfy 1≤x≤4/3 and that do not contain hydrogen and oxygen.

7. The semiconductor pressure sensor according to claim 4, further comprising a protective film formed on the surface of the second semiconductor substrate that receives pressure, on a side surface of the second semiconductor substrate, on a side surface of the first intermediate semiconductor substrate, on a side surface of the second intermediate semiconductor substrate, on a side surface of the first oxide film, on a side surface of the second oxide film, and on a side surface of the third oxide film.

8. The semiconductor pressure sensor according to claim 7, wherein the protective film is a multilayer film obtained by laminating silicon nitride films SiNx that satisfy 1≤x≤4/3 and that do not contain hydrogen and oxygen.

9. A semiconductor pressure sensor comprising:
a first semiconductor substrate having a plurality of recesses formed thereon;
an intermediate semiconductor substrate joined to the first semiconductor substrate with a first oxide film interposed therebetween;
a second semiconductor substrate joined to the intermediate semiconductor substrate with a second oxide film interposed therebetween;
a first reference pressure chamber formed as a space surrounded by a first recess of the first semiconductor substrate and the intermediate semiconductor substrate;

a second reference pressure chamber formed as a space surrounded by a second recess formed on the first semiconductor substrate, the intermediate semiconductor substrate, and the second semiconductor substrate, the intermediate semiconductor substrate having a through hole communicating with the second recess of the first semiconductor substrate;

piezoresistors formed on a surface of the second semiconductor substrate that receives pressure, along outer peripheries of the first reference pressure chamber and the second reference pressure chamber; and a protective film formed on the surface of the second semiconductor substrate that receives pressure, wherein the protective film is a multilayer film obtained by laminating silicon nitride films SiNx that satisfy 1≤x≤4/3 and that do not contain hydrogen and oxygen.

10. A semiconductor pressure sensor comprising,
a first semiconductor substrate having a plurality of recesses formed thereon;
an intermediate semiconductor substrate joined to the first semiconductor substrate with a first oxide film interposed therebetween;
a second semiconductor substrate joined to the intermediate semiconductor substrate with a second oxide film interposed therebetween,
a first reference pressure chamber formed as a space surround by a first recess of the first semiconductor substrate and the intermediate semiconductor substrate;
a second reference pressure chamber formed as a space surrounded by a second recess formed on the first semiconductor substrate, the intermediate semiconductor substrate, and the second semiconductor substrate, the intermediate semiconductor substrate having a through hole communicating with the second recess of the first semiconductor substrate;

piezoresistors formed on a surface of the second semiconductor substrate that receives pressure, along outer peripheries of the first reference pressure chamber and the second reference pressure chamber; and a protective film formed on the surface of the second semiconductor substrate that receives pressure, on a side surface of the second semiconductor substrate, on a side surface of the intermediate semiconductor substrate, on a side surface of the first oxide film, and on a side surface of the second oxide film, wherein the protective film is a multilayer film obtained by laminating silicon nitride films SiNx that satisfy, 1≤x≤4/3 and that do not contain hydrogen and oxygen.

* * * * *